(12) United States Patent
Swift et al.

(10) Patent No.: US 10,181,896 B1
(45) Date of Patent: Jan. 15, 2019

(54) SYSTEMS AND METHODS FOR REDUCING POWER CONSUMPTION IN A SATELLITE COMMUNICATION DEVICE

(71) Applicant: Hand Held Products, Inc., Fort Mill, SC (US)

(72) Inventors: Simon Richard Swift, Herefordshire (GB); Mark Rice, Kensington Park (AU); Philip Spear, Gloucestershire (GB)

(73) Assignee: HAND HELD PRODUCTS, INC., Fort Mill, SC (US)

( * ) Notice: Subject to any disclaimer, the term of this patent is extended or adjusted under 35 U.S.C. 154(b) by 0 days.

(21) Appl. No.: 15/800,333

(22) Filed: Nov. 1, 2017

(51) Int. Cl.
*H04B 7/185* (2006.01)
*H04W 52/02* (2009.01)

(52) U.S. Cl.
CPC .... *H04B 7/18519* (2013.01); *H04W 52/0203* (2013.01)

(58) Field of Classification Search
CPC .......... H04B 7/18519; H04W 52/0203; H04W 52/0209
See application file for complete search history.

(56) References Cited

U.S. PATENT DOCUMENTS

| | | | |
|---|---|---|---|
| 6,272,316 B1 | 8/2001 | Wiedeman et al. | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,403,154 B2 | 7/2008 | Garin et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |

(Continued)

FOREIGN PATENT DOCUMENTS

WO 2013163789 A1 11/2013

*Primary Examiner* — Raymond Dean
(74) *Attorney, Agent, or Firm* — Additon, Higgins & Pendleton, P.A.

(57) ABSTRACT

The present disclosure is generally directed to systems and methods for utilizing an operating schedule to place a satellite communication device in a sleep state for reducing power consumption in the satellite communication device during periods of time when no satellite is available to communicate with the satellite communication device. The operating schedule, which can be a wake-up schedule and/or a sleep schedule, is dynamically updated by a scheduling server that receives two-line element (TLE) data from a TLE server on a recurring basis and uses the TLE data to determine timing information pertaining to line-of-sight visibility of one or more satellites to the satellite communication device. A push routine is then used by the scheduling server to periodically push the timing information to the satellite communication device for dynamically updating the operating schedule of the satellite communication device.

20 Claims, 5 Drawing Sheets

(56) References Cited

U.S. PATENT DOCUMENTS

| | | |
|---|---|---|
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |

(56) References Cited

U.S. PATENT DOCUMENTS

| | | |
|---|---|---|
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |
| 9,384,374 B2 | 7/2016 | Bianconi |
| 9,390,596 B2 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |

(56) References Cited

U.S. PATENT DOCUMENTS

| | | |
|---|---|---|
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |

(56) References Cited

U.S. PATENT DOCUMENTS

| | | |
|---|---|---|
| 2016/0109581 A1 | 4/2016 | Harvey et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delano et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

IRIDIUM 94 [+]

SYSTEMS AND METHODS FOR REDUCING POWER CONSUMPTION IN A SATELLITE COMMUNICATION DEVICE

FIELD OF THE INVENTION

The present invention generally relates to satellite communication devices and more particularly relates to systems and methods for reducing power consumption in satellite communication devices.

BACKGROUND

It is generally desirable to conserve power in any kind of device. However, it is particularly desirable to do so in battery-powered devices that use wireless communication to execute various types of functions. For example, certain battery-powered devices derive positioning information via wireless signals received from a set of geosynchronous satellites that use Global Positioning System (GPS) technology. A few examples of GPS-enabled devices include smartphones and locator tags. A locator tag, which is typically attached to an object such as an automobile or a movable asset, can use GPS satellite communications to provide location information of the object to which the tag is attached. The locator tag is typically powered by one or more batteries and it is desirable that the batteries be optimized in terms of various parameters such as size, capacity, and cost. Some of these parameters can be optimized by using various techniques to place a battery-charged device in a power down mode, for example by detecting an idle state during which battery power is being consumed unnecessarily. However, an idle state is not the only state during which battery power may be consumed unnecessarily. Another state where battery power may be consumed unnecessarily is a state during which a battery-charged device is engaged in unnecessary activity. For example, a locator tag may be repeatedly trying to communicate with a satellite even though no satellite is available for communication at that time. It is therefore desirable that such unnecessary operations be eliminated and/or addressed in order to optimize battery usage.

SUMMARY

In an exemplary embodiment in accordance with the disclosure, a method includes receiving in a satellite communication device, at least one of a wake-up schedule or a sleep schedule, the at least one of the wake-up schedule or the sleep schedule derived from satellite orbital data comprising a two-line element (TLE) set; storing the at least one of the wake-up schedule or the sleep schedule in a data storage element of the satellite communication device; and utilizing the at least one of the wake-up schedule or the sleep schedule to place one or more components of the satellite communication device in a sleep state to reduce power consumption in the satellite communication device.

In another exemplary embodiment in accordance with the disclosure, a method includes communicatively coupling a scheduling server to a satellite communication device via a communication network; defining a push schedule in the scheduling server; obtaining in the scheduling server, from a two-line element (TLE) server, TLE data that provides orbital information of at least one satellite; using the TLE data to identify one or more time periods when an antenna of the satellite communication device has a line-of-sight visibility with respect to at least one satellite; defining a wake-up schedule for the satellite communication device based on at least one of the one or more time periods; and using the push schedule to transfer the wake-up schedule from the scheduling server to the satellite communication device.

In yet another exemplary embodiment in accordance with the disclosure, a satellite communication device includes a receiver, a data storage element, and a power management system. The receiver is configured to receive at least one of a wake-up schedule or a sleep schedule that is derived from satellite orbital data comprising a two-line element (TLE) set. The data storage element is configured to store the at least one of the wake-up schedule or the sleep schedule. The power management system is configured to utilize the at least one of the wake-up schedule or the sleep schedule to place one or more components of the satellite communication device in a sleep state to reduce power consumption in the satellite communication device.

The foregoing illustrative summary, as well as other exemplary objectives and/or advantages described in this disclosure, and the manner in which the same are accomplished, are further explained within the following detailed description and its accompanying drawings.

DETAILED DESCRIPTION

Throughout this description, embodiments and variations are described for the purpose of illustrating uses and implementations of inventive concepts. The illustrative description should be understood as presenting examples of inventive concepts, rather than as limiting the scope of the concepts as disclosed herein. Towards this end, certain words and terms are used herein solely for convenience and such words and terms should be broadly understood as encompassing various objects and actions that are generally understood in various forms and equivalencies by persons of ordinary skill in the art. For example, the word "asset" as used herein can be replaced with words such as "device," "gadget," "instrument," and "product" when used in various some other contexts. It should also be understood that the word "example" as used herein is intended to be non-exclusionary and non-limiting in nature. More particularly, the word "exemplary" as used herein indicates one among several examples and it should be understood that no special emphasis, exclusivity, or preference, is associated or implied by the use of this word.

The present disclosure is generally directed to systems and methods for utilizing an operating schedule to place a satellite communication device in a sleep state for reducing power consumption in the satellite communication device during periods of time when no satellite is available to communicate with the satellite communication device. The operating schedule, which can be a wake-up schedule and/or a sleep schedule, is dynamically updated by a scheduling server that receives two-line element (TLE) data from a TLE server on a recurring basis and uses the TLE data to determine timing information pertaining to line-of-sight visibility of one or more satellites to the satellite communication device. A push routine is then used by the scheduling server to periodically push the timing information to the satellite communication device for dynamically updating the operating schedule of the satellite communication device.

Figure 1:
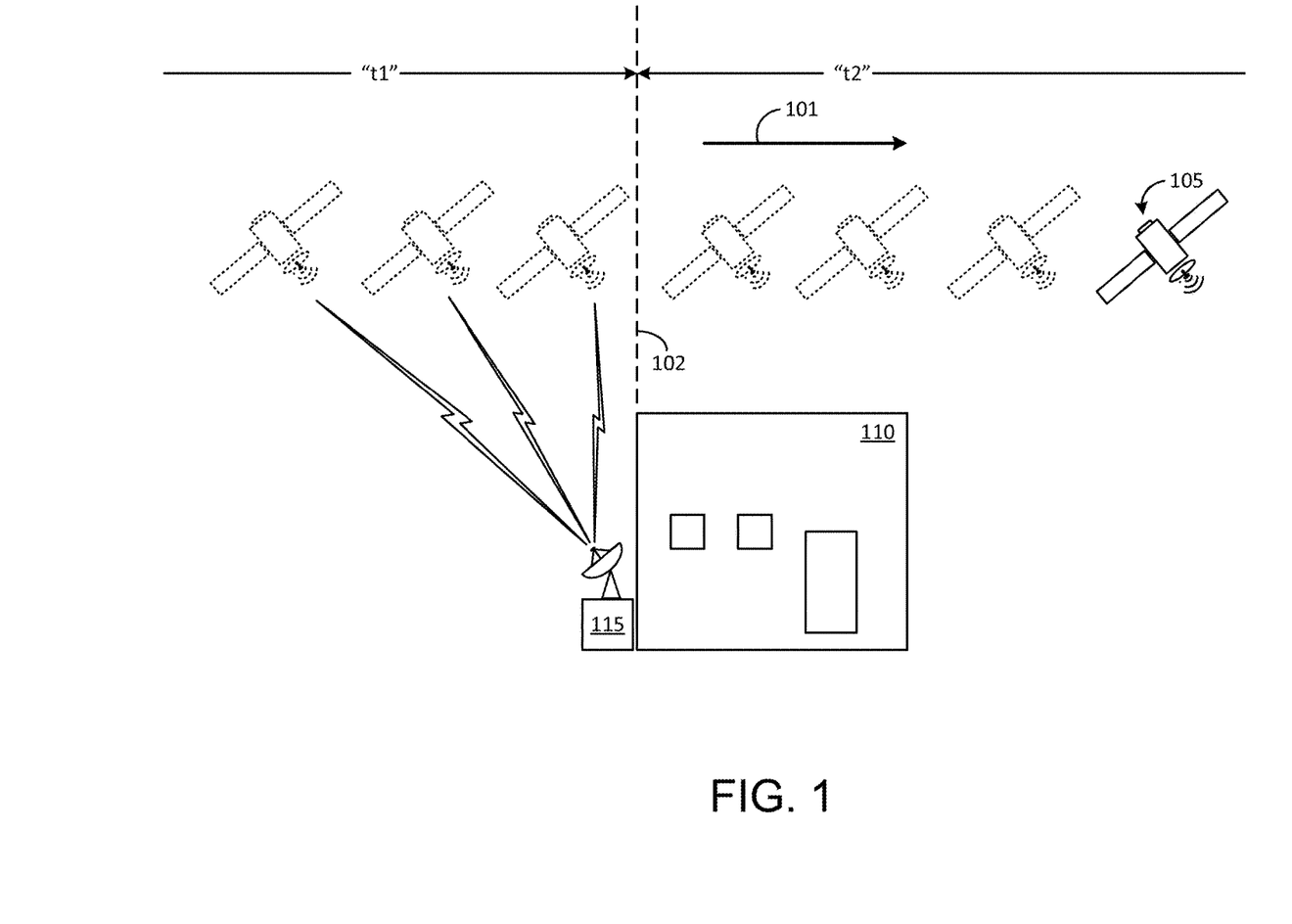
FIG. 1 schematically depicts an exemplary satellite communication device communicating with a satellite, in accordance with the disclosure.

FIG. 1 schematically depicts an exemplary satellite communication device 115 communicating with a satellite 105 in accordance with the disclosure. The satellite 105, which can be one of various types of satellites such as a communication satellite, a weather satellite, a navigation satellite, an earth observation satellite, or a miniaturized satellite, moves along a trajectory 101 in the sky above the satellite communication device 115.

In a first exemplary implementation, the satellite communication device 115 is a fixed asset that is located next to, or attached to, a building 110 and operates by using one or more batteries. In a second exemplary implementation, the satellite communication device 115 includes a locator tab attached to a movable asset such as a shipping container that is temporarily placed next to the building 110. The locator tab is powered by one or more batteries and is configured to communicate with the satellite 105 for providing location information of the movable asset.

Line-of-sight visibility of the satellite 105 is available to the satellite communication device 115 during a time period "t1" that is shown with respect to a vertical axis 102 aligned to a vertical portion of the building 110 beside which the satellite communication device 115 is located. The building 110 obstructs the line-of-sight visibility of the satellite 105 with respect to the satellite communication device 115 during a time period "t2" and it would be pointless for the satellite communication device 115 to attempt to communicate with the satellite 105 during the time period "t2."

In a known approach, the satellite communication device 115 can be configured to recognize obstruction of the line-of-sight visibility of the satellite 105 with respect to the satellite communication device 115 by utilizing a map of the sky over the satellite communication device 115. The map, which can be generated by the satellite communication device 115 over a period of time, provides historical data of the movement of the satellite 105 along the trajectory 101. However, this known approach may prove inadequate under certain circumstances such as when the map is outdated, when the quantity of data collected for generating the map is inadequate, when the trajectory 101 and/or schedule of the satellite 105 changes, and/or when a different satellite that can be used by the satellite communication device 115 travels along the trajectory 101 and is not recognized by the satellite communication device 115 due to the map being outdated.

Consequently, in accordance with the disclosure, the satellite communication device 115 utilizes a dynamically updated operating schedule to recognize time period "t2" and enter into a sleep state for reducing power consumption. The power consumption can be directed at extending battery life of the one or more batteries used by the satellite communication device 115 (when the satellite communication device 115 is battery-powered) or when the time period "t2" extends for an extended period of time (days, weeks, months etc.) and the satellite communication device 115 is mains-powered.

Figure 2:
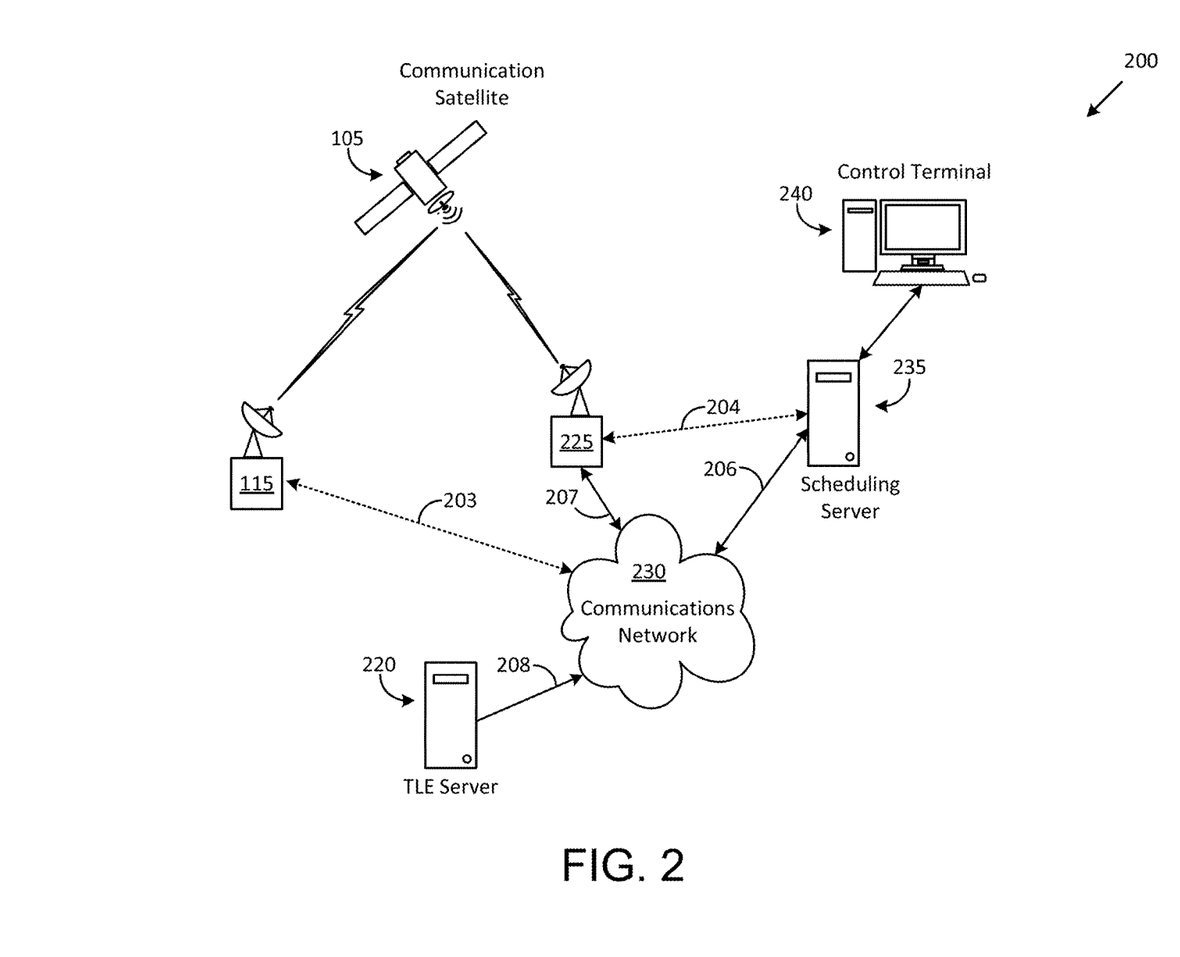
FIG. 2 schematically depicts an exemplary system that can be used to configure an operating schedule of a satellite communication device in accordance with an embodiment of the disclosure.

FIG. 2 schematically depicts an exemplary system 200 that can be used to configure an operating schedule of the satellite communication device 115 in accordance with an embodiment of the disclosure. The system 200 includes a control terminal 240 communicatively coupled to a scheduling server 235. The scheduling server 235 is communicatively coupled to a communications network 230, which can be one of various types of communications networks such as the Internet, a local area network, or a wide area network. The control terminal 240 is configured to be utilized by a human operator (not shown) to access the scheduling server 235 for executing various operations. For example, the control terminal 240 can include a user interface such as a webpage that allows the human operator to define a push schedule for use by the scheduling server 235. This operation, as well as other actions pertaining to the disclosure, will be described below in further detail.

In accordance with the disclosure, the scheduling server 235 communicates with a TLE server 220 (via the communications network 230) to obtain satellite orbital data. In one exemplary embodiment, the satellite orbital data is provided to the scheduling server 235 in a two-line element (TLE) format. However, in other embodiments, the satellite orbital data can be provided to the scheduling server 235 in formats other than TLE. The TLE format is typically used for encoding orbital elements of an Earth-orbiting object at a given point in time that is referred to as an epoch. The satellite orbital data, which can be stored in a database of the TLE server 220, is dynamically updated, thus reflecting any changes that may have taken place in the satellite orbital data over various periods of time. The scheduling server 235 uses the satellite orbital data to determine orbital path parameters (such as position and velocity) of the satellite 105 at any given time in the past and/or to predict orbital path parameters of the satellite 105 in the future.

In accordance with an exemplary embodiment, the scheduling server 235 utilizes the orbital path parameters to determine the time periods "t1" and "t2" of the satellite communication device 115 with respect to the satellite 105. Information such as the precise location of the satellite communication device 115 and/or the building 110 can be provided to the scheduling server 235 in various ways in order to assist the scheduling server 235 when determining "t1" and "t2."

For example, in a first exemplary implementation, the satellite communication device 115 can employ GPS techniques to pinpoint a location of the satellite communication device 115 at any given instant in time and transmit the position information to the scheduling server 235 via a communication link 203 and the communications network 230 for example.

In a second exemplary implementation, the location of the satellite communication device 115 can be provided to the scheduling server 235 by a human operator via the control terminal 240. The location information can be obtained by the human operator by carrying out an onsite evaluation where the satellite communication device 115 is located. the onsite evaluation can include the use of a compass or a handheld GPS device, for example, to obtain the location information.

In addition to obtaining the location information of the satellite communication device 115 by using one or more of the methods described above, the scheduling server 235 repetitively fetches the orbital path parameters from the TLE server 220 and determines the time periods "t1" and "t2" after each fetch operation so as to address any changes that may have been introduced into the orbital path parameters of the satellite 105 (a change in orbital path, a change in orbital timing etc.). The repetitive fetching can be executed on a recurring basis, an intermittent basis, and/or an as-needed basis. When executed on a recurring basis, the scheduling server 235 fetches the orbital path parameters from the TLE server 220 using for example, a daily fetch schedule, a twice-daily fetch schedule, and/or an hourly fetch schedule. When executed on an intermittent basis or an as-needed basis, the scheduling server 235 may be prompted by a message received from the control terminal 240. The message may be generated by a human operator based on knowledge of an expected change or a confirmed change in the satellite orbital data stored in the TLE server 220 and/or based on other factors such as a frequency of change in the orbital data parameters as a result of the dynamic update rate used by the TLE server 220.

The scheduling server 235 uses the time periods "t1" and "t2" to generate at least one of a sleep schedule or a wake-up schedule for the satellite communication device 115. The sleep schedule and/or wake-up schedule can be defined in various ways such as in terms of second, minutes, hours, days etc. based on the nature of the satellite communication device 115. Thus, when the satellite communication device 115 is a part of a fixed asset, the sleep schedule and/or wake-up schedule can be defined solely on the basis of the orbital data parameters of the satellite 105. On the other hand, when the satellite communication device 115 is a part of a movable asset, the sleep schedule and/or wake-up schedule can be defined on the basis of the orbital data parameters of the satellite 105 as well as on a current location of the satellite communication device 115 (for example, a locator tag attached to a container located on a ship in transit).

The scheduling server 235 transmits the sleep schedule and/or wake-up schedule to the satellite communication device 115 by using a push schedule that is provided by a human operator via the control terminal 240 (by using a webpage, for example) or automatically generated by the scheduling server 235. The push schedule can be based on various parameters such as on the fetch schedule used by the scheduling server 235 to obtain satellite orbital data from the TLE server 220, one or more parameters associated with the satellite communication device 115 (location, functionality etc.), and/or a customer preference.

In one exemplary implementation, the scheduling server 235 transmits the sleep schedule and/or wake-up schedule (via communication link 204) to a transmitter 225 that communicates with the satellite 105, which in turn propagates the sleep schedule and/or wake-up schedule to the satellite communication device 115.

In another exemplary implementation, the scheduling server 235 transmits the sleep schedule and/or wake-up schedule to the communication network 230 via a communications link 206. The satellite communication device 115 obtains the sleep schedule and/or wake-up schedule from the communication network 230 via a communications link 203.

In yet another exemplary implementation, the scheduling server 235 transmits the sleep schedule and/or wake-up schedule to the communication network 230 via the communications link 206, which in turn routes the sleep schedule and/or wake-up schedule to the transmitter 225 via a communications link 207. The transmitter 225 transmits the sleep schedule and/or wake-up schedule to the satellite 105, which then forwards the sleep schedule and/or wake-up schedule to the satellite communication device 115.

Figure 3:
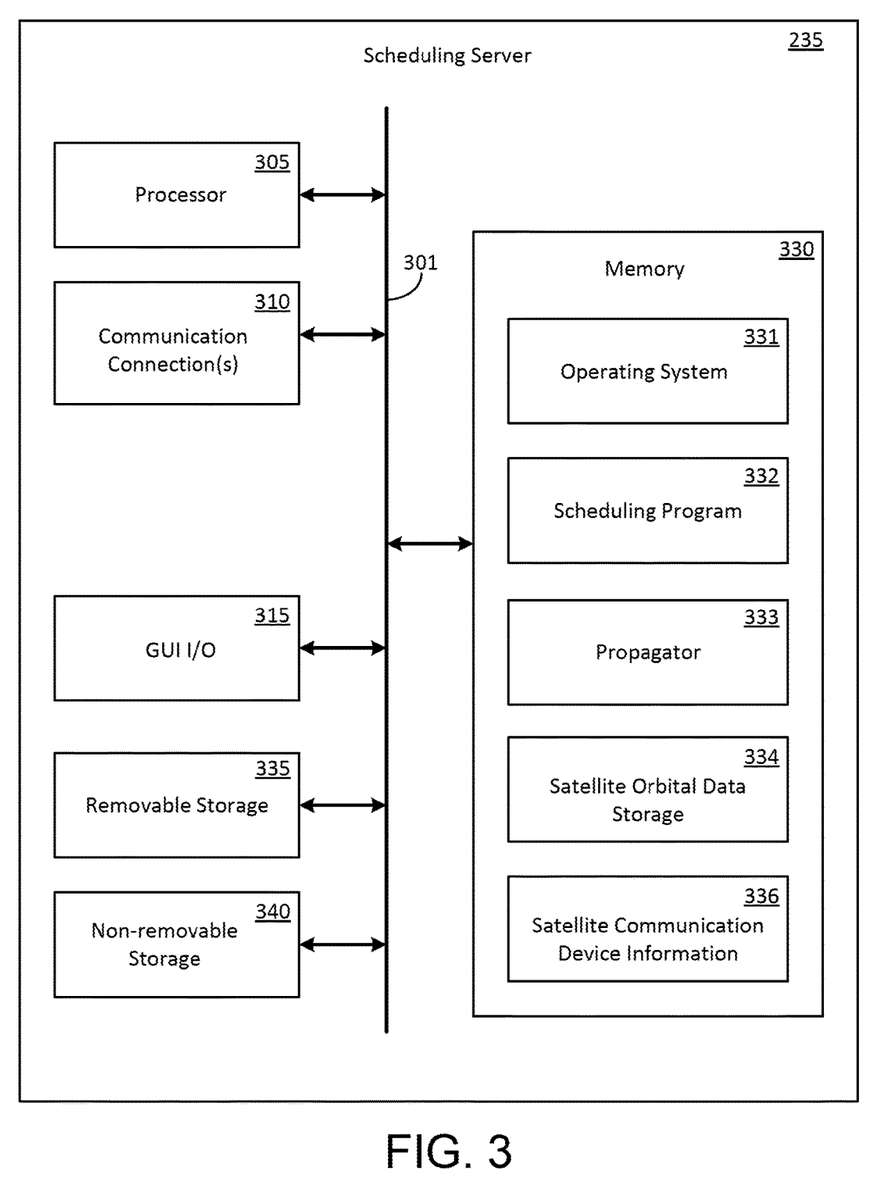
FIG. 3 shows some exemplary components of a scheduling server that is a part of the system shown in FIG. 2.

FIG. 3 shows some exemplary components of the scheduling server 235. The scheduling server 235 can include one or more processors, such as the processor 305 that is configured to communicatively cooperate with a memory 330 via a bus 301. The processor 305 can be implemented and operated using appropriate hardware, software, firmware, or combinations thereof. Software or firmware implementations can include computer-executable or machine-executable instructions written in any suitable programming language to perform the various functions described in this disclosure.

The memory 330 can be used to store program instructions that are loadable and executable by the processor 305, as well as to store data generated during the execution of these programs. Depending on the configuration and type of the scheduling server 235, the memory 330 can be volatile (such as random access memory (RAM)) and/or non-volatile (such as read-only memory (ROM), flash memory, etc.). In some embodiments, the scheduling server 235 can include additional removable storage 335 and/or non-removable storage 340 including, but not limited to, magnetic storage, optical disks, and/or tape storage. The disk drives and their associated computer-readable media can provide non-volatile storage of computer-readable instructions, data structures, program modules, and other data. In some implementations, the memory 330 can include multiple types of memory, such as static random access memory (SRAM), dynamic random access memory (DRAM), or ROM.

The memory 330, the removable storage 335, and the non-removable storage 340 are all examples of data storage elements generally referred to as non-transient computer-readable storage media. Such non-transient computer-readable storage media can be implemented in a wide variety of ways that are directed at storage of items such as computer-readable instructions, data structures, and/or program modules. Additional types of non-transient computer storage media that can be present include, but are not limited to, programmable random access memory (PRAM), SRAM, DRAM, ROM, electrically erasable programmable read-only memory (EEPROM), compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the processor 305. Combinations of any of the above should also be included within the scope of non-transient computer-readable storage media.

The memory 330 can include, but is not limited to, an operating system (OS) 331 and one or more application programs or services for implementing the features and aspects disclosed herein. Such application programs or services can include a scheduling program 332, a propagator 333, satellite orbital data storage 334, and satellite communication device information 336.

The scheduling server 235 can also include elements such as communications connections 310 and a graphical user interface (GUI) input/output 315. The communications connections 310 can be used to communicatively couple the scheduling server 235 to other components, such as the TLE server 220, the satellite communication device 115, the transmitter 225, and the control terminal 240. The GUI input/output 315 can be used by a human operator to execute some functions such as provisioning or configuring, that are associated with the scheduling server 235.

Turning back to the memory 330, the scheduling program 332 is executed by the processor 305 to carry out various functionalities of the scheduling server 235, such as fetching satellite orbital data from the TLE server 220, storing the fetched satellite orbital data in the satellite orbital data storage 334, and executing the propagator 333 to convert the contents of the satellite orbital data storage 334 into at least one of a sleep schedule or a wake-up schedule for the satellite communication device 115. When executing the propagator 333, the scheduling program 332 may utilize satellite communication device information 336 (such as location, availability, operating status etc.) in combination with the satellite orbital data for generating the sleep schedule and/or wake-up schedule for the satellite communication device 115.

Figure 4:
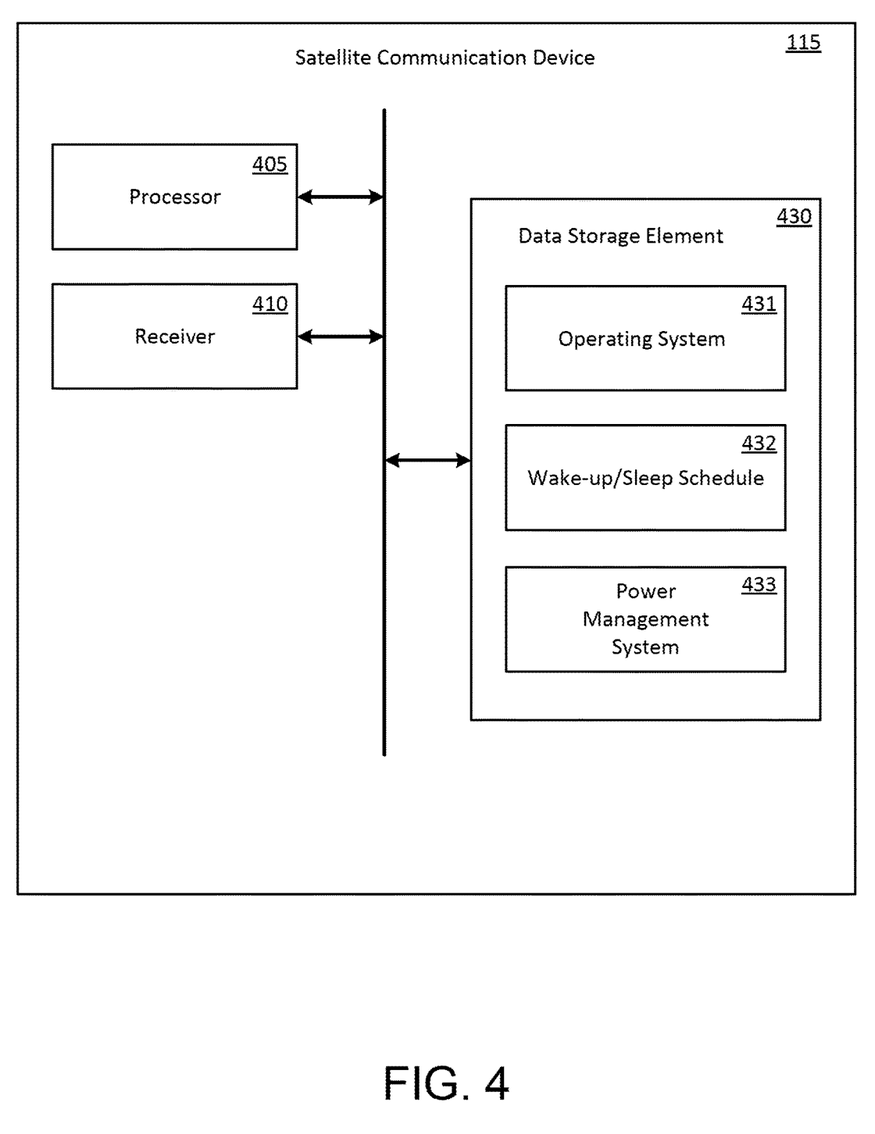
FIG. 4 shows some exemplary components of a satellite communication device that is a part of the system shown in FIG. 2.

FIG. 4 shows some exemplary components of the satellite communication device 115. The satellite communication device 115 can include one or more processors, such as the processor 405 that is configured to communicatively cooperate with a memory 430. Details pertaining to the hardware aspects of the processor 405 and the memory 430 are similar to those of the processor 305 and the memory 330 described above and will not be repeated here in the interests of brevity. As for the software aspects, the processor 405 and the memory 430 are configured for executing various programs and functionalities of the satellite communication device 115. Towards this end, the memory 430 can include, but is not limited to, an operating system (OS) 431 and one or more application programs or services for implementing the features and aspects disclosed herein with respect to the satellite communication device 115. Such application programs or services can include a wake-up/sleep schedule 432 and a power management system 433. The wake-up/sleep schedule 432 is based on timing information provided to the satellite communication device 115 by the scheduling server 235 as described above.

The wake-up/sleep schedule 432 is utilized by the processor 405 to identify periods of time corresponding to a wake state and/or a sleep state of the satellite communication device 115. When entering a sleep state, the power management system 433 is operative to powering down various components of the satellite communication device 115 so as to reduce power consumption in the satellite communication device 115. More particularly, when the satellite communication device 115 uses one or more batteries, powering down various components of the satellite communication device 115 extends a battery life of the one or more batteries.

Furthermore, in one exemplary implementation, the satellite communication device 115 includes one or more electric charge storing elements such as capacitors, for storing an electric charge that can be used for various purposes such as for operating as a temporary back-up power source to power one or more components in the satellite communication device 115. Powering down various components of the satellite communication device 115 by the power management system 433 helps extend a storage period of the electric charge stored in such electric charge storing elements. When transitioning into a wake state, the power management system 433 powers up the powered down components of the satellite communication device 115.

In one exemplary implementation in accordance with the disclosure, the processor 405 adds a suitable period of time ahead of the wake-up schedule provided by the scheduling server 235 so as to place the satellite communication device 115 in a wake state prior to the satellite 105 coming into line-of-sight visibility to the satellite communication device 115. This feature proves particularly useful when the time period "t1" during which the satellite communication device 115 has line-of-sight visibility to the satellite 105 is small and has to be utilized optimally by the satellite communication device 115.

In another exemplary implementation in accordance with the disclosure, the processor 305 in the scheduling server 235 adds a suitable period of time to the wake-up schedule in order to ensure that the satellite communication device 115 is in a wake state prior to the satellite 105 coming into line-of-sight visibility to the satellite communication device 115. The wake-up schedule can then be used without any modification by the processor 405 in the satellite communication device 115.

The satellite communication device 115 further includes a receiver 410 configured to communicate with the satellite 105 and/or with other elements, such as one or more GPS satellites. The satellite communication device 115 can also include various other components such as communications connections, a graphical user interface (GUI), removable storage, and non-removable storage that are described above with reference to the scheduling server 235.

Figure 5:
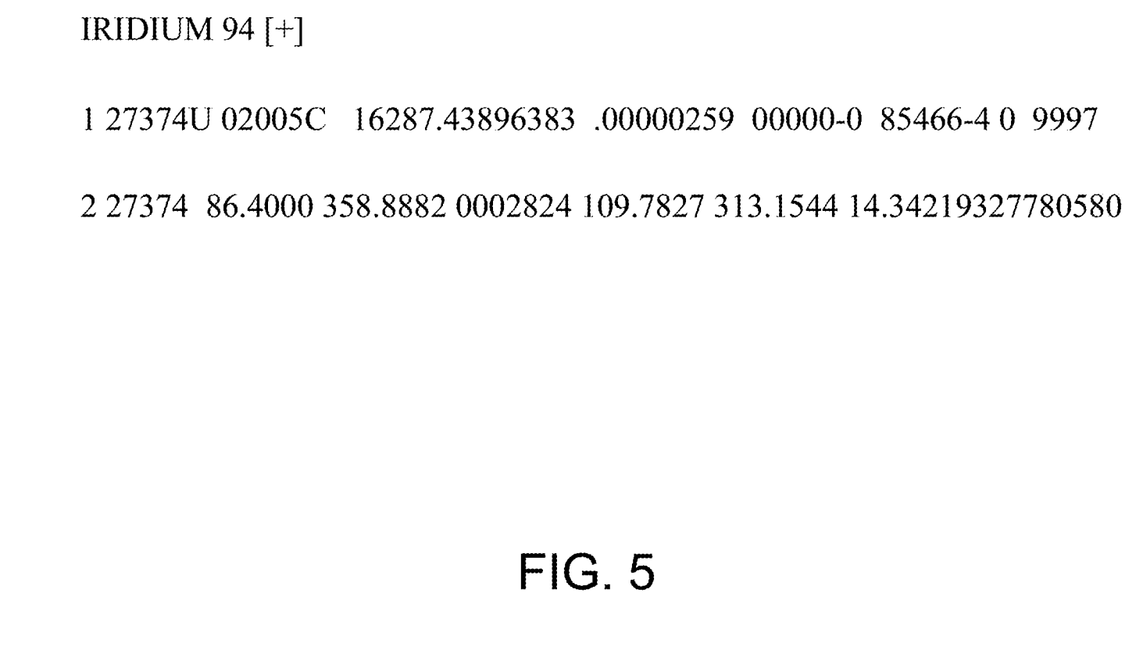
FIG. 5 shows an exemplary two-line element that is used to generate a sleep/wake schedule in accordance with the disclosure.

FIG. 5 shows an exemplary two-line element (TLE) that is used to generate a sleep/wake schedule in accordance with the disclosure. The TLE data is dynamically updated in the TLE server 220 and fetched by the scheduling server 235 as described above.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;

U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. 8,740,082;
U.S. Pat. No. 8,740,085; U.S. Pat. No. 8,746,563;
U.S. Pat. No. 8,750,445; U.S. Pat. No. 8,752,766;
U.S. Pat. No. 8,756,059; U.S. Pat. No. 8,757,495;
U.S. Pat. No. 8,760,563; U.S. Pat. No. 8,763,909;
U.S. Pat. No. 8,777,108; U.S. Pat. No. 8,777,109;
U.S. Pat. No. 8,779,898; U.S. Pat. No. 8,781,520;
U.S. Pat. No. 8,783,573; U.S. Pat. No. 8,789,757;
U.S. Pat. No. 8,789,758; U.S. Pat. No. 8,789,759;
U.S. Pat. No. 8,794,520; U.S. Pat. No. 8,794,522;
U.S. Pat. No. 8,794,525; U.S. Pat. No. 8,794,526;
U.S. Pat. No. 8,798,367; U.S. Pat. No. 8,807,431;
U.S. Pat. No. 8,807,432; U.S. Pat. No. 8,820,630;
U.S. Pat. No. 8,822,848; U.S. Pat. No. 8,824,692;
U.S. Pat. No. 8,824,696; U.S. Pat. No. 8,842,849;
U.S. Pat. No. 8,844,822; U.S. Pat. No. 8,844,823;
U.S. Pat. No. 8,849,019; U.S. Pat. No. 8,851,383;
U.S. Pat. No. 8,854,633; U.S. Pat. No. 8,866,963;
U.S. Pat. No. 8,868,421; U.S. Pat. No. 8,868,519;
U.S. Pat. No. 8,868,802; U.S. Pat. No. 8,868,803;
U.S. Pat. No. 8,870,074; U.S. Pat. No. 8,879,639;
U.S. Pat. No. 8,880,426; U.S. Pat. No. 8,881,983;
U.S. Pat. No. 8,881,987; U.S. Pat. No. 8,903,172;
U.S. Pat. No. 8,908,995; U.S. Pat. No. 8,910,870;
U.S. Pat. No. 8,910,875; U.S. Pat. No. 8,914,290;
U.S. Pat. No. 8,914,788; U.S. Pat. No. 8,915,439;
U.S. Pat. No. 8,915,444; U.S. Pat. No. 8,916,789;
U.S. Pat. No. 8,918,250; U.S. Pat. No. 8,918,564;
U.S. Pat. No. 8,925,818; U.S. Pat. No. 8,939,374;
U.S. Pat. No. 8,942,480; U.S. Pat. No. 8,944,313;
U.S. Pat. No. 8,944,327; U.S. Pat. No. 8,944,332;
U.S. Pat. No. 8,950,678; U.S. Pat. No. 8,967,468;
U.S. Pat. No. 8,971,346; U.S. Pat. No. 8,976,030;
U.S. Pat. No. 8,976,368; U.S. Pat. No. 8,978,981;
U.S. Pat. No. 8,978,983; U.S. Pat. No. 8,978,984;
U.S. Pat. No. 8,985,456; U.S. Pat. No. 8,985,457;
U.S. Pat. No. 8,985,459; U.S. Pat. No. 8,985,461;
U.S. Pat. No. 8,988,578; U.S. Pat. No. 8,988,590;
U.S. Pat. No. 8,991,704; U.S. Pat. No. 8,996,194;
U.S. Pat. No. 8,996,384; U.S. Pat. No. 9,002,641;
U.S. Pat. No. 9,007,368; U.S. Pat. No. 9,010,641;
U.S. Pat. No. 9,015,513; U.S. Pat. No. 9,016,576;
U.S. Pat. No. 9,022,288; U.S. Pat. No. 9,030,964;
U.S. Pat. No. 9,033,240; U.S. Pat. No. 9,033,242;
U.S. Pat. No. 9,036,054; U.S. Pat. No. 9,037,344;
U.S. Pat. No. 9,038,911; U.S. Pat. No. 9,038,915;
U.S. Pat. No. 9,047,098; U.S. Pat. No. 9,047,359;
U.S. Pat. No. 9,047,420; U.S. Pat. No. 9,047,525;
U.S. Pat. No. 9,047,531; U.S. Pat. No. 9,053,055;
U.S. Pat. No. 9,053,378; U.S. Pat. No. 9,053,380;
U.S. Pat. No. 9,058,526; U.S. Pat. No. 9,064,165;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Pat. No. 9,076,459; U.S. Pat. No. 9,079,423;
U.S. Pat. No. 9,080,856; U.S. Pat. No. 9,082,023;
U.S. Pat. No. 9,082,031; U.S. Pat. No. 9,084,032;
U.S. Pat. No. 9,087,250; U.S. Pat. No. 9,092,681;
U.S. Pat. No. 9,092,682; U.S. Pat. No. 9,092,683;
U.S. Pat. No. 9,093,141; U.S. Pat. No. 9,098,763;
U.S. Pat. No. 9,104,929; U.S. Pat. No. 9,104,934;
U.S. Pat. No. 9,107,484; U.S. Pat. No. 9,111,159;
U.S. Pat. No. 9,111,166; U.S. Pat. No. 9,135,483;
U.S. Pat. No. 9,137,009; U.S. Pat. No. 9,141,839;
U.S. Pat. No. 9,147,096; U.S. Pat. No. 9,148,474;
U.S. Pat. No. 9,158,000; U.S. Pat. No. 9,158,340;
U.S. Pat. No. 9,158,953; U.S. Pat. No. 9,159,059;
U.S. Pat. No. 9,165,174; U.S. Pat. No. 9,171,543;
U.S. Pat. No. 9,183,425; U.S. Pat. No. 9,189,669;
U.S. Pat. No. 9,195,844; U.S. Pat. No. 9,202,458;
U.S. Pat. No. 9,208,366; U.S. Pat. No. 9,208,367;
U.S. Pat. No. 9,219,836; U.S. Pat. No. 9,224,024;
U.S. Pat. No. 9,224,027; U.S. Pat. No. 9,230,140;
U.S. Pat. No. 9,235,553; U.S. Pat. No. 9,239,950;
U.S. Pat. No. 9,245,492; U.S. Pat. No. 9,248,640;
U.S. Pat. No. 9,250,652; U.S. Pat. No. 9,250,712;
U.S. Pat. No. 9,251,411; U.S. Pat. No. 9,258,033;
U.S. Pat. No. 9,262,633; U.S. Pat. No. 9,262,660;
U.S. Pat. No. 9,262,662; U.S. Pat. No. 9,269,036;
U.S. Pat. No. 9,270,782; U.S. Pat. No. 9,274,812;
U.S. Pat. No. 9,275,388; U.S. Pat. No. 9,277,668;
U.S. Pat. No. 9,280,693; U.S. Pat. No. 9,286,496;
U.S. Pat. No. 9,298,964; U.S. Pat. No. 9,301,427;
U.S. Pat. No. 9,313,377; U.S. Pat. No. 9,317,037;
U.S. Pat. No. 9,319,548; U.S. Pat. No. 9,342,723;
U.S. Pat. No. 9,361,882; U.S. Pat. No. 9,365,381;
U.S. Pat. No. 9,373,018; U.S. Pat. No. 9,375,945;
U.S. Pat. No. 9,378,403; U.S. Pat. No. 9,383,848;
U.S. Pat. No. 9,384,374; U.S. Pat. No. 9,390,304;
U.S. Pat. No. 9,390,596; U.S. Pat. No. 9,411,386;
U.S. Pat. No. 9,412,242; U.S. Pat. No. 9,418,269;
U.S. Pat. No. 9,418,270; U.S. Pat. No. 9,465,967;
U.S. Pat. No. 9,423,318; U.S. Pat. No. 9,424,454;
U.S. Pat. No. 9,436,860; U.S. Pat. No. 9,443,123;
U.S. Pat. No. 9,443,222; U.S. Pat. No. 9,454,689;
U.S. Pat. No. 9,464,885; U.S. Pat. No. 9,465,967;
U.S. Pat. No. 9,478,983; U.S. Pat. No. 9,481,186;
U.S. Pat. No. 9,487,113; U.S. Pat. No. 9,488,986;
U.S. Pat. No. 9,489,782; U.S. Pat. No. 9,490,540;
U.S. Pat. No. 9,491,729; U.S. Pat. No. 9,497,092;
U.S. Pat. No. 9,507,974; U.S. Pat. No. 9,519,814;
U.S. Pat. No. 9,521,331; U.S. Pat. No. 9,530,038;
U.S. Pat. No. 9,572,901; U.S. Pat. No. 9,558,386;
U.S. Pat. No. 9,606,581; U.S. Pat. No. 9,646,189;
U.S. Pat. No. 9,646,191; U.S. Pat. No. 9,652,648;
U.S. Pat. No. 9,652,653; U.S. Pat. No. 9,656,487;
U.S. Pat. No. 9,659,198; U.S. Pat. No. 9,680,282;
U.S. Pat. No. 9,697,401; U.S. Pat. No. 9,701,140;
U.S. Design Pat. No. D702,237;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D734,339;
U.S. Design Pat. No. D737,321;
U.S. Design Pat. No. D754,205;
U.S. Design Pat. No. D754,206;
U.S. Design Pat. No. D757,009;
U.S. Design Pat. No. D760,719;
U.S. Design Pat. No. D762,604;

U.S. Design Pat. No. D766,244;
U.S. Design Pat. No. D777,166;
U.S. Design Pat. No. D771,631;
U.S. Design Pat. No. D783,601;
U.S. Design Pat. No. D785,617;
U.S. Design Pat. No. D785,636;
U.S. Design Pat. No. D790,505;
U.S. Design Pat. No. D790,546;
International Publication No. 2013/163789;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0194692;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0332996;
U.S. Patent Application Publication No. 2014/0001267;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131443;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0191684;
U.S. Patent Application Publication No. 2014/0191913;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0231500;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0332590;
U.S. Patent Application Publication No. 2014/0351317;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0009338;
U.S. Patent Application Publication No. 2015/0014416;
U.S. Patent Application Publication No. 2015/0021397;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0049347;
U.S. Patent Application Publication No. 2015/0051992;
U.S. Patent Application Publication No. 2015/0053769;
U.S. Patent Application Publication No. 2015/0062366;
U.S. Patent Application Publication No. 2015/0063215;
U.S. Patent Application Publication No. 2015/0088522;
U.S. Patent Application Publication No. 2015/0096872;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0149946;

U.S. Patent Application Publication No. 2015/0161429;
U.S. Patent Application Publication No. 2015/0178523;
U.S. Patent Application Publication No. 2015/0178537;
U.S. Patent Application Publication No. 2015/0178685;
U.S. Patent Application Publication No. 2015/0181109;
U.S. Patent Application Publication No. 2015/0199957;
U.S. Patent Application Publication No. 2015/0210199;
U.S. Patent Application Publication No. 2015/0212565;
U.S. Patent Application Publication No. 2015/0213647;
U.S. Patent Application Publication No. 2015/0220753;
U.S. Patent Application Publication No. 2015/0220901;
U.S. Patent Application Publication No. 2015/0227189;
U.S. Patent Application Publication No. 2015/0236984;
U.S. Patent Application Publication No. 2015/0239348;
U.S. Patent Application Publication No. 2015/0242658;
U.S. Patent Application Publication No. 2015/0248572;
U.S. Patent Application Publication No. 2015/0254485;
U.S. Patent Application Publication No. 2015/0261643;
U.S. Patent Application Publication No. 2015/0264624;
U.S. Patent Application Publication No. 2015/0268971;
U.S. Patent Application Publication No. 2015/0269402;
U.S. Patent Application Publication No. 2015/0288689;
U.S. Patent Application Publication No. 2015/0288896;
U.S. Patent Application Publication No. 2015/0310243;
U.S. Patent Application Publication No. 2015/0310244;
U.S. Patent Application Publication No. 2015/0310389;
U.S. Patent Application Publication No. 2015/0312780;
U.S. Patent Application Publication No. 2015/0327012;
U.S. Patent Application Publication No. 2016/0014251;
U.S. Patent Application Publication No. 2016/0025697;
U.S. Patent Application Publication No. 2016/0026838;
U.S. Patent Application Publication No. 2016/0026839;
U.S. Patent Application Publication No. 2016/0040982;
U.S. Patent Application Publication No. 2016/0042241;
U.S. Patent Application Publication No. 2016/0057230;
U.S. Patent Application Publication No. 2016/0062473;
U.S. Patent Application Publication No. 2016/0070944;
U.S. Patent Application Publication No. 2016/0092805;
U.S. Patent Application Publication No. 2016/0101936;
U.S. Patent Application Publication No. 2016/0104019;
U.S. Patent Application Publication No. 2016/0104274;
U.S. Patent Application Publication No. 2016/0109219;
U.S. Patent Application Publication No. 2016/0109220;
U.S. Patent Application Publication No. 2016/0109224;
U.S. Patent Application Publication No. 2016/0112631;
U.S. Patent Application Publication No. 2016/0112643;
U.S. Patent Application Publication No. 2016/0117627;
U.S. Patent Application Publication No. 2016/0124516;
U.S. Patent Application Publication No. 2016/0125217;
U.S. Patent Application Publication No. 2016/0125342;
U.S. Patent Application Publication No. 2016/0125873;
U.S. Patent Application Publication No. 2016/0133253;
U.S. Patent Application Publication No. 2016/0171597;
U.S. Patent Application Publication No. 2016/0171666;
U.S. Patent Application Publication No. 2016/0171720;
U.S. Patent Application Publication No. 2016/0171775;
U.S. Patent Application Publication No. 2016/0171777;
U.S. Patent Application Publication No. 2016/0174674;
U.S. Patent Application Publication No. 2016/0178479;
U.S. Patent Application Publication No. 2016/0178685;
U.S. Patent Application Publication No. 2016/0178707;
U.S. Patent Application Publication No. 2016/0179132;
U.S. Patent Application Publication No. 2016/0179143;
U.S. Patent Application Publication No. 2016/0179368;
U.S. Patent Application Publication No. 2016/0179378;
U.S. Patent Application Publication No. 2016/0180130;
U.S. Patent Application Publication No. 2016/0180133;
U.S. Patent Application Publication No. 2016/0180136;
U.S. Patent Application Publication No. 2016/0180594;
U.S. Patent Application Publication No. 2016/0180663;
U.S. Patent Application Publication No. 2016/0180678;
U.S. Patent Application Publication No. 2016/0180713;
U.S. Patent Application Publication No. 2016/0185136;
U.S. Patent Application Publication No. 2016/0185291;
U.S. Patent Application Publication No. 2016/0186926;
U.S. Patent Application Publication No. 2016/0188861;
U.S. Patent Application Publication No. 2016/0188939;
U.S. Patent Application Publication No. 2016/0188940;
U.S. Patent Application Publication No. 2016/0188941;
U.S. Patent Application Publication No. 2016/0188942;
U.S. Patent Application Publication No. 2016/0188943;
U.S. Patent Application Publication No. 2016/0188944;
U.S. Patent Application Publication No. 2016/0189076;
U.S. Patent Application Publication No. 2016/0189087;
U.S. Patent Application Publication No. 2016/0189088;
U.S. Patent Application Publication No. 2016/0189092;
U.S. Patent Application Publication No. 2016/0189284;
U.S. Patent Application Publication No. 2016/0189288;
U.S. Patent Application Publication No. 2016/0189366;
U.S. Patent Application Publication No. 2016/0189443;
U.S. Patent Application Publication No. 2016/0189447;
U.S. Patent Application Publication No. 2016/0189489;
U.S. Patent Application Publication No. 2016/0192051;
U.S. Patent Application Publication No. 2016/0202951;
U.S. Patent Application Publication No. 2016/0202958;
U.S. Patent Application Publication No. 2016/0202959;
U.S. Patent Application Publication No. 2016/0203021;
U.S. Patent Application Publication No. 2016/0203429;
U.S. Patent Application Publication No. 2016/0203797;
U.S. Patent Application Publication No. 2016/0203820;
U.S. Patent Application Publication No. 2016/0204623;
U.S. Patent Application Publication No. 2016/0204636;
U.S. Patent Application Publication No. 2016/0204638;
U.S. Patent Application Publication No. 2016/0227912;
U.S. Patent Application Publication No. 2016/0232891;
U.S. Patent Application Publication No. 2016/0292477;
U.S. Patent Application Publication No. 2016/0294779;
U.S. Patent Application Publication No. 2016/0306769;
U.S. Patent Application Publication No. 2016/0314276;
U.S. Patent Application Publication No. 2016/0314294;
U.S. Patent Application Publication No. 2016/0316190;
U.S. Patent Application Publication No. 2016/0323310;
U.S. Patent Application Publication No. 2016/0325677;
U.S. Patent Application Publication No. 2016/0327614;
U.S. Patent Application Publication No. 2016/0327930;
U.S. Patent Application Publication No. 2016/0328762;
U.S. Patent Application Publication No. 2016/0330218;
U.S. Patent Application Publication No. 2016/0343163;
U.S. Patent Application Publication No. 2016/0343176;
U.S. Patent Application Publication No. 2016/0364914;
U.S. Patent Application Publication No. 2016/0370220;
U.S. Patent Application Publication No. 2016/0372282;
U.S. Patent Application Publication No. 2016/0373847;
U.S. Patent Application Publication No. 2016/0377414;
U.S. Patent Application Publication No. 2016/0377417;
U.S. Patent Application Publication No. 2017/0010141;
U.S. Patent Application Publication No. 2017/0010328;
U.S. Patent Application Publication No. 2017/0010780;
U.S. Patent Application Publication No. 2017/0016714;
U.S. Patent Application Publication No. 2017/0018094;
U.S. Patent Application Publication No. 2017/0046603;
U.S. Patent Application Publication No. 2017/0047864;
U.S. Patent Application Publication No. 2017/0053146;
U.S. Patent Application Publication No. 2017/0053147;

U.S. Patent Application Publication No. 2017/0053647;
U.S. Patent Application Publication No. 2017/0055606;
U.S. Patent Application Publication No. 2017/0060316;
U.S. Patent Application Publication No. 2017/0061961;
U.S. Patent Application Publication No. 2017/0064634;
U.S. Patent Application Publication No. 2017/0083730;
U.S. Patent Application Publication No. 2017/0091502;
U.S. Patent Application Publication No. 2017/0091706;
U.S. Patent Application Publication No. 2017/0091741;
U.S. Patent Application Publication No. 2017/0091904;
U.S. Patent Application Publication No. 2017/0092908;
U.S. Patent Application Publication No. 2017/0094238;
U.S. Patent Application Publication No. 2017/0098947;
U.S. Patent Application Publication No. 2017/0100949;
U.S. Patent Application Publication No. 2017/0108838;
U.S. Patent Application Publication No. 2017/0108895;
U.S. Patent Application Publication No. 2017/0118355;
U.S. Patent Application Publication No. 2017/0123598;
U.S. Patent Application Publication No. 2017/0124369;
U.S. Patent Application Publication No. 2017/0124396;
U.S. Patent Application Publication No. 2017/0124687;
U.S. Patent Application Publication No. 2017/0126873;
U.S. Patent Application Publication No. 2017/0126904;
U.S. Patent Application Publication No. 2017/0139012;
U.S. Patent Application Publication No. 2017/0140329;
U.S. Patent Application Publication No. 2017/0140731;
U.S. Patent Application Publication No. 2017/0147847;
U.S. Patent Application Publication No. 2017/0150124;
U.S. Patent Application Publication No. 2017/0169198;
U.S. Patent Application Publication No. 2017/0171035;
U.S. Patent Application Publication No. 2017/0171703;
U.S. Patent Application Publication No. 2017/0171803;
U.S. Patent Application Publication No. 2017/0180359;
U.S. Patent Application Publication No. 2017/0180577;
U.S. Patent Application Publication No. 2017/0181299;
U.S. Patent Application Publication No. 2017/0190192;
U.S. Patent Application Publication No. 2017/0193432;
U.S. Patent Application Publication No. 2017/0193461;
U.S. Patent Application Publication No. 2017/0193727;
U.S. Patent Application Publication No. 2017/0199266;
U.S. Patent Application Publication No. 2017/0200108; and
U.S. Patent Application Publication No. 2017/0200275.

In the specification and/or figures, exemplary embodiments of the invention have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method comprising:
receiving in a satellite communication device, at least one of a wake-up schedule or a sleep schedule, the at least one of the wake-up schedule or the sleep schedule derived from satellite orbital data comprising a two-line element (TLE) set;
storing the at least one of the wake-up schedule or the sleep schedule in a data storage element of the satellite communication device; and
utilizing the at least one of the wake-up schedule or the sleep schedule to place one or more components of the satellite communication device in a sleep state to reduce power consumption in the satellite communication device.

2. The method of claim 1, wherein the at least one of the wake-up schedule or the sleep schedule is defined on the basis of at least one of extending a battery life of one or more batteries in the satellite communication device or extending a storage period of an electric charge in an electric charge storing element contained in the satellite communication device.

3. The method of claim 1, wherein the at least one of the wake-up schedule or the sleep schedule is received in the satellite communication device from a scheduling server that is configured to periodically fetch the satellite orbital data from a dynamically-updated TLE database in a TLE server.

4. The method of claim 3, wherein the scheduling server is further configured to use a push schedule to transmit the satellite orbital data to the satellite communication device via a communications satellite.

5. The method of claim 4, wherein the push schedule is a periodically recurring schedule.

6. The method of claim 5, wherein the periodically recurring schedule is based at least in part on a frequency of change in the dynamically-updated TLE database.

7. The method of claim 4, wherein the scheduling server is further configured to execute the push schedule conditional to detecting a change in a current version of the satellite orbital data in comparison to a previous version of the satellite orbital data.

8. The method of claim 1, wherein the satellite orbital data comprises data indicative of at least one of a first duration of time when an antenna of the satellite communication device has a line-of-sight visibility with at least one satellite or a second duration of time when the antenna of the satellite communication device loses the line-of-sight visibility with respect to the at least one satellite.

9. The method of claim 8, further comprising utilizing the at least one of the wake-up schedule or the sleep schedule to place the one or more components of the satellite communication device in a wake state, the wake state characterized at least in part by an establishment of communication between the satellite communication device and at least one satellite during a first period of time when the satellite communication device has a line-of-sight visibility with respect to the at least one satellite.

10. The method of claim 9, wherein the wake state is characterized by a first duration that is defined by using one of a number of seconds or a first number of minutes, and the sleep state is characterized by a second duration that is defined by using one of a second number of minutes or a number of hours.

11. A method comprising:
communicatively coupling a scheduling server to a satellite communication device via a communication network;
defining a push schedule in the scheduling server;
obtaining in the scheduling server, from a two-line element (TLE) server, TLE data that provides orbital information of at least one satellite;
using the TLE data to identify one or more time periods when an antenna of the satellite communication device has a line-of-sight visibility with respect to at least one satellite;
defining a wake-up schedule for the satellite communication device based on at least one of the one or more time periods; and
using the push schedule to transfer the wake-up schedule from the scheduling server to the satellite communication device.

12. The method of claim 11, wherein defining the push schedule in the scheduling server comprises a human operator using at least one of a webpage, a configuration file or a database.

13. The method of claim 11, further comprising:
defining a sleep schedule for the satellite communication device based on the at least one of the one or more time periods; and
transmitting the sleep schedule from the scheduling server to the satellite communication device.

14. The method of claim 11, wherein obtaining the TLE data in the scheduling server is carried out periodically by using at least one of a daily fetch schedule, a twice-daily fetch schedule, or an hourly fetch schedule.

15. The method of claim 14, wherein the push schedule is a periodically recurring schedule that is determined at least in part on the at least one of the daily fetch schedule, the twice-daily fetch schedule, or the hourly fetch schedule used for obtaining the TLE data in the scheduling server.

16. A satellite communication device comprising:
a receiver configured to receive at least one of a wake-up schedule or a sleep schedule that is derived from satellite orbital data comprising a two-line element (TLE) set;
a data storage element configured to store the at least one of the wake-up schedule or the sleep schedule; and
a power management system configured to utilize the at least one of the wake-up schedule or the sleep schedule to place one or more components of the satellite communication device in a sleep state to reduce power consumption in the satellite communication device.

17. The satellite communication device of claim 16, wherein the receiver is configured to receive the at least one of the wake-up schedule or the sleep schedule from a scheduling server that is configured to periodically obtain the satellite orbital data from a dynamically-updated TLE server and to use a push schedule to transmit the at least one of the wake-up schedule or the sleep schedule to the receiver.

18. The satellite communication device of claim 17, wherein the receiver is configured to receive the at least one of the wake-up schedule or the sleep schedule based on the push schedule of the scheduling server.

19. The satellite communication device of claim 18, wherein the push schedule is a periodically recurring schedule.

20. The satellite communication device of claim 19, wherein the periodically recurring schedule is based at least in part on a frequency of change in the dynamically-updated TLE server.

* * * * *